(12) United States Patent
Sakata et al.

(10) Patent No.: US 11,385,977 B2
(45) Date of Patent: Jul. 12, 2022

(54) RECONFIGURATION CONTROL DEVICE

(71) Applicant: HITACHI, LTD., Tokyo (JP)

(72) Inventors: Teruaki Sakata, Tokyo (JP); Teppei Hirotsu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 420 days.

(21) Appl. No.: 16/607,296

(22) PCT Filed: Apr. 25, 2017

(86) PCT No.: PCT/JP2017/016332
§ 371 (c)(1),
(2) Date: Oct. 22, 2019

(87) PCT Pub. No.: WO2018/198184
PCT Pub. Date: Nov. 1, 2018

(65) Prior Publication Data
US 2020/0050164 A1 Feb. 13, 2020

(51) Int. Cl.
G06F 11/20 (2006.01)
G06F 11/16 (2006.01)

(52) U.S. Cl.
CPC ...... G06F 11/2028 (2013.01); G06F 11/2025 (2013.01); G06F 11/2035 (2013.01);
(Continued)

(58) Field of Classification Search
CPC ............ G06F 11/1629; G06F 11/1633; G06F 11/1654; G06F 11/2023; G06F 11/2025;
(Continued)

(56) References Cited

U.S. PATENT DOCUMENTS 5,796,937 A * 8/1998 Kizuka ............... G06F 11/2035
714/6.32
7,366,948 B2 * 4/2008 Michaelis ........... G06F 11/2079
714/12
(Continued)

FOREIGN PATENT DOCUMENTS

JP 2006-302289 A 11/2006
JP 2008-305317 A 12/2008
(Continued)

OTHER PUBLICATIONS

M. Imai, T. Nagai and T. Nanya, "Pair and swap: An approach to graceful degradation for dependable chip multiprocessors," 2010 International Conference on Dependable Systems and Networks Workshops (DSN-W), 2010, pp. 119-124, doi: 10.1109/DSNW.2010.5542608. (Year: 2010).*

(Continued)

Primary Examiner — Bryce P Bonzo
Assistant Examiner — Albert Li
(74) Attorney, Agent, or Firm — Volpe Koenig

(57) ABSTRACT

In the invention, a problem is solved in which, in order to achieve high performance and high reliability with the conventional multi-core and lockstep core, a redundant lockstep core is necessarily prepared to execute a multi-core program in which an error has occurred, a circuit area increases, and a cost and a power consumption increase. In the invention, a safe operation of a control system is secured by operating a software program operating on a multi-core in which an error has occurred as degenerate software on a core switched from a lockstep operation to a multi-core operation.

8 Claims, 8 Drawing Sheets

(52) U.S. Cl.
CPC .... *G06F 11/1629* (2013.01); *G06F 2201/845* (2013.01); *G06F 2201/85* (2013.01)

(58) Field of Classification Search
CPC ............ G06F 11/2028; G06F 11/2035; G06F 11/2038; G06F 11/2041; G06F 2201/845; G06F 2201/85; G05B 19/0425; G05B 19/0428
See application file for complete search history.

(56) References Cited

U.S. PATENT DOCUMENTS

| | | | | |
|---|---|---|---|---|
| 8,635,492 B2* | 1/2014 | Gara | ................... | G06F 11/1658 714/11 |
| 8,935,569 B2* | 1/2015 | Kabulepa | .............. | G06F 11/165 714/11 |
| 9,734,006 B2* | 8/2017 | Lupescu | ............. | G06F 11/1641 |
| 2006/0236168 A1* | 10/2006 | Wolfe | ................. | G06F 15/7867 714/E11.061 |
| 2006/0245264 A1 | 11/2006 | Barr et al. | | |
| 2010/0162042 A1* | 6/2010 | Inoue | ................. | G06F 11/2025 714/11 |

FOREIGN PATENT DOCUMENTS

| | | |
|---|---|---|
| JP | 4422596 B2 | 2/2010 |
| JP | 2016-157247 A | 9/2016 |

OTHER PUBLICATIONS

International Search Report dated May 30, 2017 for the PCT International Application No. PCT/JP2017/016332.

* cited by examiner

RECONFIGURATION CONTROL DEVICE

TECHNICAL FIELD

The present invention relates to a reconfiguration control device.

BACKGROUND ART

With miniaturization of semiconductor processes, it is possible to integrate a plurality of CPU (Central Processing Unit) cores in one device.

For industrial and embedded applications, a multi-core configuration may be adopted which obtains high processing performance while reducing power consumption by multi-processing multiple CPU cores, and a lock-step (LS) core configuration may be adopted which obtains high reliability by collating the result obtained by operating the same software program (software) on multiple CPU cores. For industrial and embedded applications, restrictions on mounting area, power consumption, cost, and the like are significant. In order to realize high performance and high reliability under such restrictions, it is considered to use multi-core or lockstep core. For example, PTL 1 describes an example of an information processing apparatus that includes a plurality of cores and a small number of lockstep cores and executes a program at a level that cannot tolerate errors in synchronization with the lockstep core. In the example of PTL 2, an example of a reconfigurable signal processing system in which electronic control units (ECUs) are distributed is described.

CITATION LIST

Patent Literature

PTL 1: JP 2016-157247 A
PTL 2: JP 4422596 B2

SUMMARY OF INVENTION

Technical Problem

Incidentally, as a result of examining the technology executed by the conventional multi-core and lockstep core, the following has been clarified.

In the example of PTL 1, it is necessary to prepare redundant lockstep cores for executing multi-core programs in which errors occur. In a case where multi-cores are implemented with high-performance CPUs such as 32-bit and 64-bit, similarly, the lockstep core needs to have high performance. Thus, there is a problem that the circuit area increases and the cost and power consumption increase.

In the example of PTL 2, a redundant ECU is required for reconfiguration, and configuration data for reconfiguration is held two by two, so that the cost becomes high, and control of reconfiguration also becomes complicated. Thus, there was a problem that it was difficult to apply to embedded applications requiring real-time performance.

Herein, the invention provides a mechanism capable of realizing high performance and high reliability at a low cost even when a multi-core or lockstep core is applied to industrial and embedded applications.

Solution to Problem

In order to solve the above problems, for example, the configuration described in the claims is adopted. The present application includes a plurality of means for solving the above-described problems. In an example thereof, a reconfiguration control device includes: a multi-core; a lockstep core; and a system control part that dynamically switches the lockstep core to a first core and a second core. The system control part dynamically switches the lockstep core to a multi-core operation when an error occurs in the multi-core, and the system control part instructs restart and diagnosis of the multi-core while the software operating on the multi-core is operating on the first core.

Advantageous Effects of Invention

According to the invention, high performance and high reliability can be realized at a low cost even when a multi-core or lockstep core is applied to industrial and embedded applications.

Problems, configurations, and effects other than those described above will become apparent from the following description of embodiments.

DESCRIPTION OF EMBODIMENTS

Hereinafter, embodiments of the invention will be described using the drawings.

First Embodiment

An example of an embodiment of the invention will be described with reference to FIGS. 1 to 5.

Figure 1:
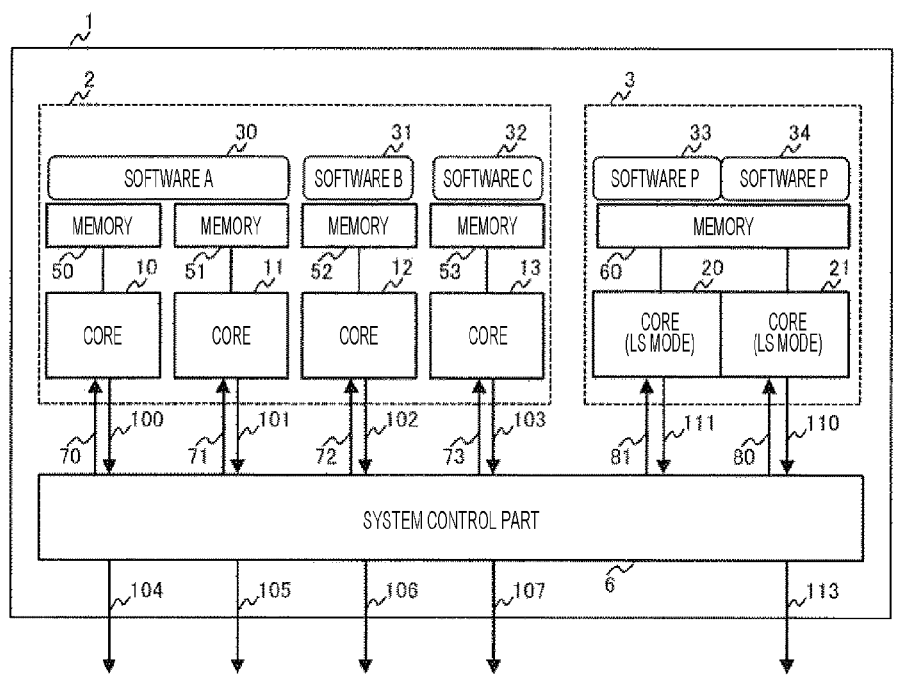
FIG. 1 is an example of a configuration for performing a multi-core operation and a lockstep operation in a reconfiguration control device of the invention in a first embodiment.

FIG. 1 illustrates an example of a reconfiguration control device of the invention.

In the reconfiguration control device illustrated in FIG. 1, four cores 10, 11, 12, and 13 are configured to be a multi-core. The core 10 is connected to a memory 50, and the software of the core 10 is arranged in the memory 50 and performs processing. Similarly, the core 11 is connected to a memory 51, the core 12 is connected to a memory 52, and the core 13 is connected to a memory 53, and each software is arranged in the memory and performs processing. In the example of FIG. 1, software A (30) is arranged in the memories 50 and 51, and multi-core operation is performed in the cores 10 and 11. On the other hand, the software B (31) is arranged only in the memory 52 and operates on the core 12, and similarly the software C (32) is arranged only in the memory 53 and operates on the core 13. These cores 10, 11, 12, 13, memories 50, 51, 52, 53, software A (30), software B (31), and software C (32) are collectively referred to as a multi-core system 2 here. Cores 20 and 21 configure a lockstep (LS). That is, the cores 20 and 21 share a memory 60, the core 20 operates software P (33), the core 21 operates the same software P (34) as the software P (33), and occurrence of an error is detected by collating during the operation. These cores 20 and 21, memory 60, software P (33), and software P (34) are collectively referred to as a lockstep core system 3 here.

As a core error detection unit, a technology such as parity, ECC (Error Correction Code), and watchdog timer are known. Further, a technology described in JP 3175896 B2 (PTL 3) is known as a collation method during the lockstep operation.

Further, in a system control part 6 illustrated in FIG. 1, a control output 100, a control output 101, a control output 102, a control output 103, a control output 111, and a control output 110 are input from the core 10, the core 11, the core 12, the core 13, the core 20, and the core 21, respectively. A reset signal 70, a reset signal 71, a reset signal 72, a reset signal 73, a switching control signal 81, and a switching control signal 80 are output to the core 10, the core 11, the core 12, the core 13, the core 20, and the core 21, respectively. Control outputs 104, 105, 106, 107, and 113 are output to the outside of a control unit 1.

Figure 2:
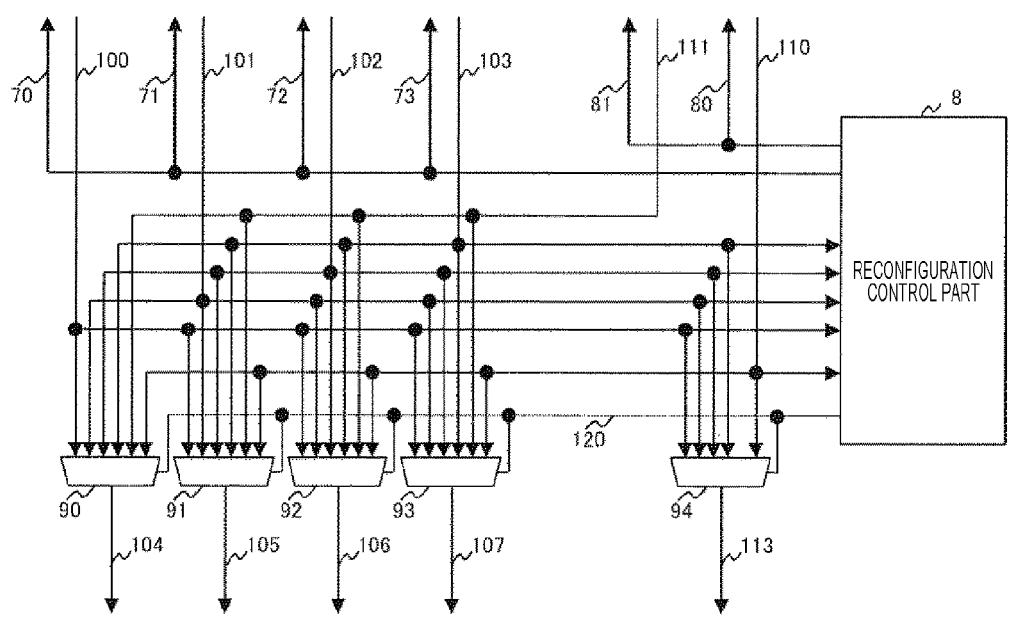
FIG. 2 is an example of a configuration method of a system control part in the reconfiguration control device according to the first embodiment.

FIG. 2 illustrates an example of a detailed configuration method of the system control part 6 illustrated in FIG. 1.

In a reconfiguration control part 8 inside the system control part 6, the control signals 100, 101, 102, 103, and 110 are input, the reset signals 70, 71, 72, and 73 and the switching control signals 81 and 80 are output, and further the selection signal 120 is output.

The multiplexer 90 selects one control output of the control outputs 100, 101, 102, 103, 111, and 110 according to the value of the selection signal 120 and outputs the selected control output as a control output 104. The same applies to multiplexers 91, 92, 93, and 94.

Figure 3:
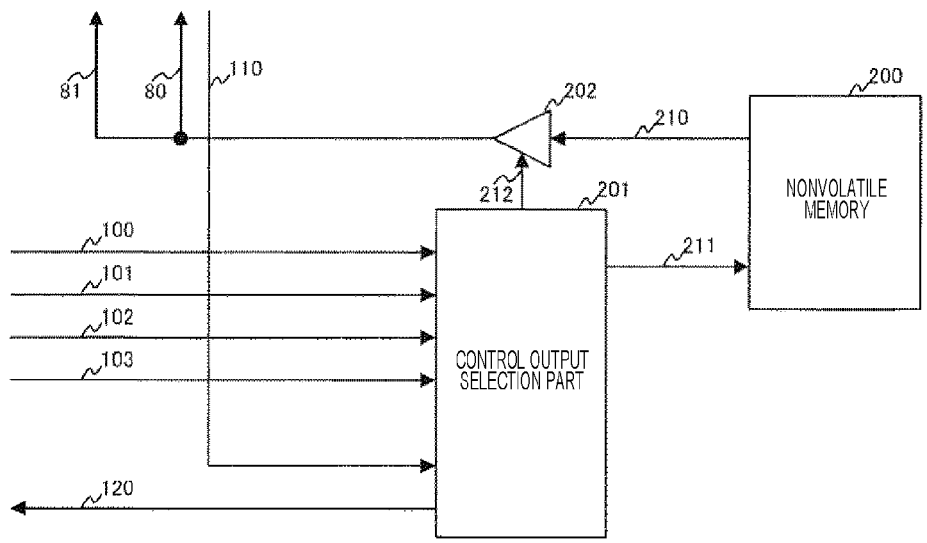
FIG. 3 is an example of a configuration method of a reconfiguration control part in the reconfiguration control device of the first embodiment.

FIG. 3 illustrates an example of a detailed configuration method of the reconfiguration control part 8 illustrated in FIG. 2.

In a nonvolatile memory 200 illustrated in FIG. 3, software that operates in a multi-core system and a lockstep core system is arranged.

A control output selection part 201 receives the control outputs 100, 101, 102, and 103 and the control output 110 and outputs a memory access signal 211 to the nonvolatile memory 200. The memory access signal 211 is a signal for reading binary data 210 of the software from the nonvolatile memory 200. For example, when an error occurs in the core 13 in FIG. 1, the error information in the core 13 is input to the control output selection part 201 by the control output 103, and the control output selection part 201 outputs the memory access signal 211 so as to read the binary data 210 of the degenerate software corresponding to the software C (32) from the nonvolatile memory 200.

The binary data 210 read from the nonvolatile memory 200 is combined with a core enable signal 212 output from the control output selection part 201 by the signal combining circuit 202 and output to the cores 20 and 21 as the switching control signals 81 and 80.

The control output selection part 201 outputs a selection signal 120. The selection signal 120 is a signal for selecting the respective control outputs 104, 105, 106, 107, and 113 output from the multiplexers 90, 91, 92, 93, and 94 illustrated in FIG. 2. For example, when an error occurs in the core 13 in FIG. 1, the control output 111 is selected and output to the control output 107 illustrated in FIG. 2 by the selection signal 120 described in FIG. 3. The other multiplexer 90 selects the control output 100 and outputs the control output as the control output 104, the multiplexer 91 selects the control output 101 and outputs the control output as the control output 105, the multiplexer 92 selects the control output 102 and outputs the control output as the control output 106, and the multiplexer 94 selects the control output 110 and outputs the control output as the control output 113.

Figure 4:
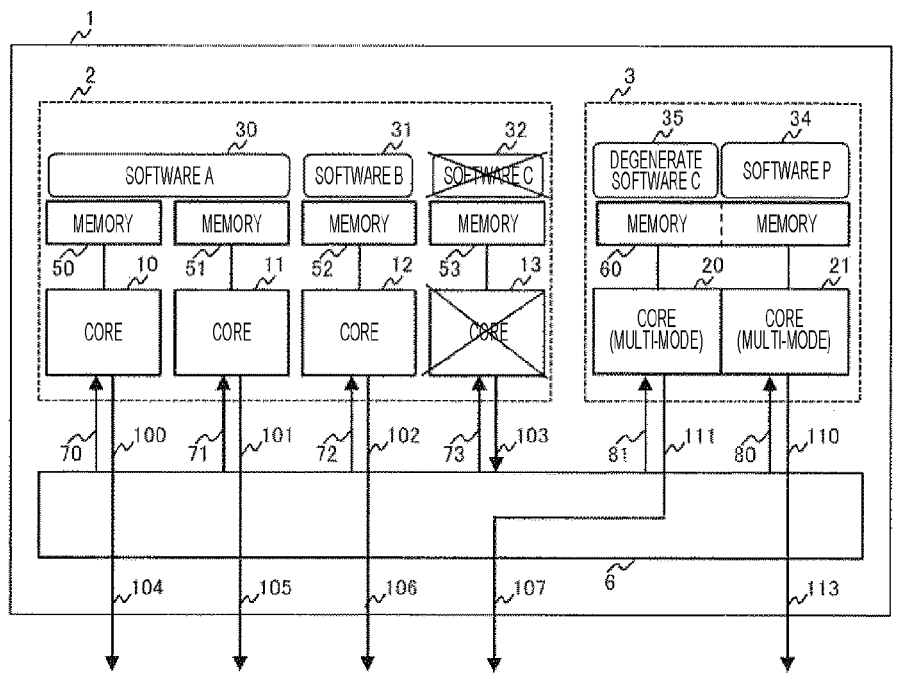
FIG. 4 is an example illustrating a configuration when the lockstep operation is switched to the multi-core operation in the reconfiguration control device of the first embodiment.

FIG. 4 is an example illustrating a configuration of a case where the lockstep operation is switched to the multi-core operation in the reconfiguration control device of the invention in the first embodiment and is different in that the lockstep core is switched from the lockstep operation to the multi-core operation mode, and the software arranged on the memory is replaced compared with the reconfiguration control device illustrated in FIG. 1.

In the control unit 1 of FIG. 4, an example is illustrated in which an error occurs in the core 13 in the multi-core system 2 and the software C (32) becomes inoperable.

According to the control output 103 from the core 13 in which an error has occurred, the cores 20 and 21 are switched from the lockstep operation mode to the multicore operation mode by the switching control signals 81 and 80 from the system control part 6 by the reconfiguration control part 8 described in FIG. 3, and the degenerate software C (35) corresponding to the software C (32) is arranged in the memory 60.

At this time, the selection signal 120 is output from the reconfiguration control part 8 described with reference to FIG. 2 such that the control output 103 from the core 13 in which an error has occurred is not output to the outside of the control unit 1 as the control output 107, and the control output 111 of the core 20 in which the degenerate software C (35) is operating is output as the control output 107.

Figure 5:
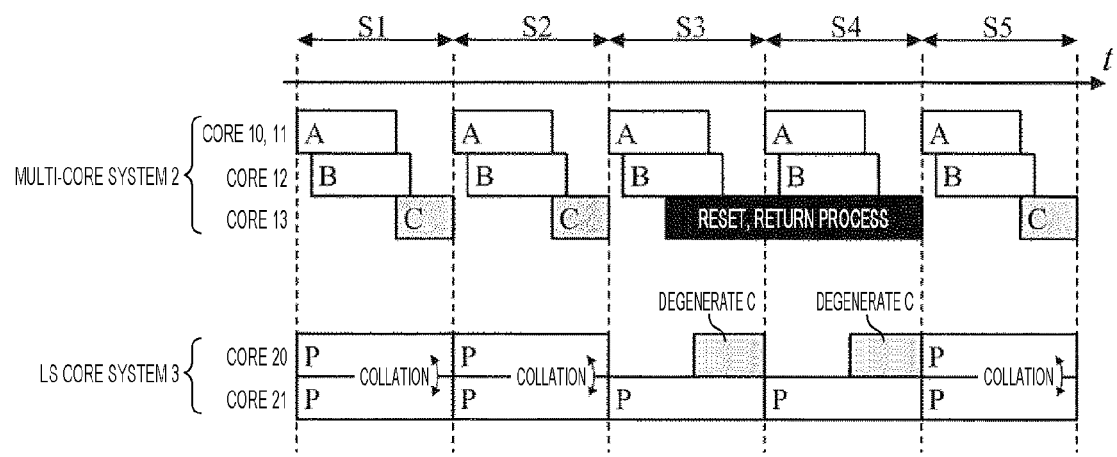
FIG. 5 is an example illustrating a timing chart in which software operates in the configuration of FIG. 4.

FIG. 5 is an example illustrating a timing chart of the software operating in the multi-core system and the lockstep core system in the reconfiguration control device illustrated in FIG. 4.

In control cycle S1, the software A (30) operates on the cores 10 and 11 of the multi-core system 2, the software B (31) operates on the core 12 following the software A (30), and further the software C (32) subsequently operates on the core 13.

In the same control cycle S1, the software P (33) operates on the core 20 of lockstep core system 3, the software P (34) operates on the core 21, and the software P (33) and software P (34) perform a collation process during operation.

Control cycle S2 in FIG. 5 is the same operation as control cycle S1.

In control cycle S3 in FIG. 5, when an error occurs in the core 13, and the software C (32) becomes inoperable, the degenerate operation described in FIG. 4 causes the core 20 to operate the degenerate software C (35), and the core 13 performs a return process by a reset signal 73 from the system control part 6.

As described above, even if an error occurs in the core 13, the software A (30), software B (31), degenerate software C (35), and software P (34) can operate in the control cycle S3, and thus a process can continue as a whole system while degenerating without stopping.

FIG. 5 illustrates an example in which the return process is performed to the control cycle S4 and a return is made at the control cycle S5. Therefore, in the control cycle S5, the software C (32) operates again in the core 13, and the software P (33) that operates in the core 20 of the lockstep core system 3 and the software P (34) that operates in the core 21 perform a collation process. By adopting such a configuration, even if an error occurs in the multi-core, the degenerate software can be operated by switching the already mounted lockstep core to the multi-core operation, and thus the operation of the control system can continue without requiring additional hardware cost.

In the first embodiment, the number of cores of the multi-core system is described as four. However, the number of cores is not limited to four and may be implemented with various numbers of cores.

Second Embodiment

Next, an example of another embodiment of the invention will be described with reference to FIGS. 6 to 10.

Figure 6:
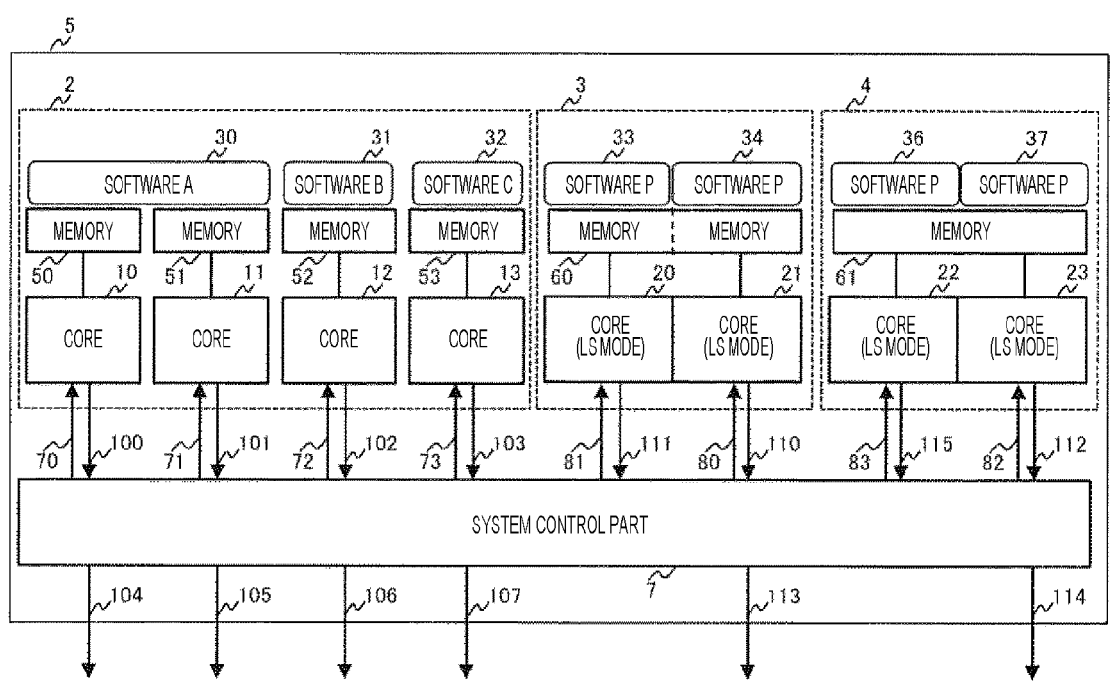
FIG. 6 is an example of a configuration for performing a multi-core operation and a lockstep operation in the reconfiguration control device of the invention in a second embodiment.

Compared to FIG. 1 of the first embodiment in the reconfiguration control device of the present invention, FIG. 6 is different in that one lockstep core system is added to form a dual lockstep core system configuration. In FIG. 6, a lockstep core system 4 including the cores 22 and 23, the memory 61, the software P (36), and the software P (37) is provided in addition to the lockstep core system 3 including the cores 20 and 21, the memory 60, the software P (33), and the software P (34). Similarly to the lockstep core system 3, in the lockstep core system 4, the cores 22 and 23 shares the memory 61, and the software P (36) operates on the core 22, the same software P (37) as the software P (36) operates on the core 23, and the collation is performed during operation to detect the occurrence of an error. Furthermore, compared to the system control part 6 described in FIG. 1, the system control part 7 illustrated in FIG. 6 has an addition in that the control output 115 and the control output 112 are input from the core 22 and the core 23, respectively, the switching control signal 83 and the switching control signal 82 are output to the core 22 and the core 23, respectively, and further the control output 114 is output to the outside of a control unit 5.

Figure 7:
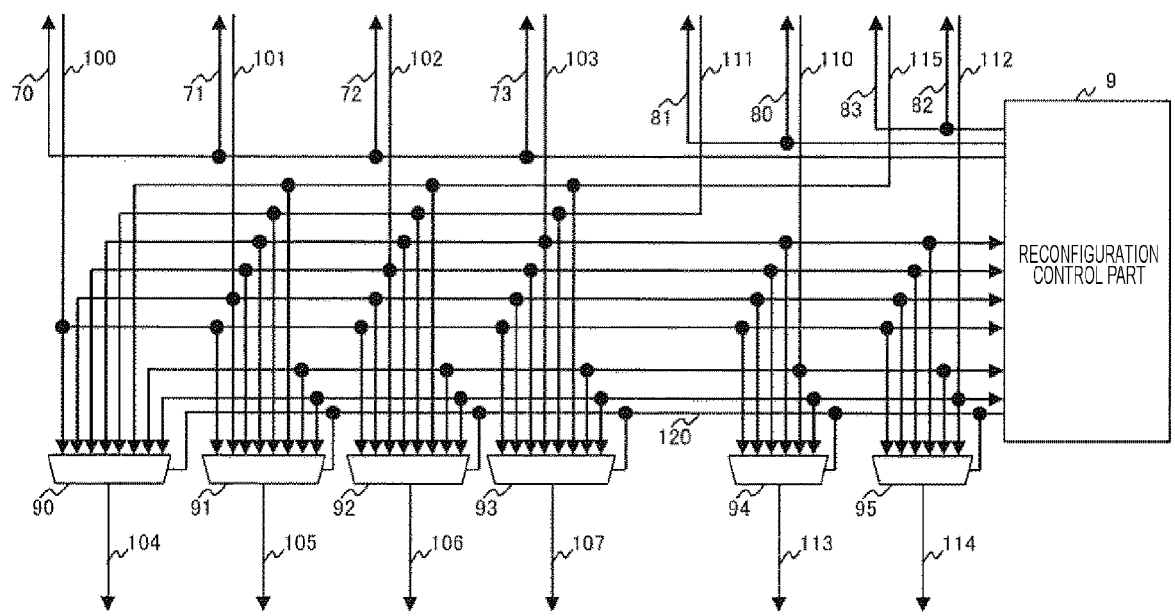
FIG. 7 is an example of a configuration method of a system control part in the reconfiguration control device of the second embodiment.

FIG. 7 illustrates an example of a detailed configuration method of the system control part 7 illustrated in FIG. 6 and is different in that the multiplexer and the control signal corresponding to the dual lockstep core system configuration are added compared to the system control part 6 described in FIG. 2.

The multiplexer 90 selects one control output of the control outputs 100, 101, 102, 103, 111, 110, 115, and 112 according to the value of the selection signal 120 and outputs the selected control output as a control output 104. The same applies to the multiplexers 91, 92, 93, and 94 and the newly added multiplexer 95.

Figure 8:
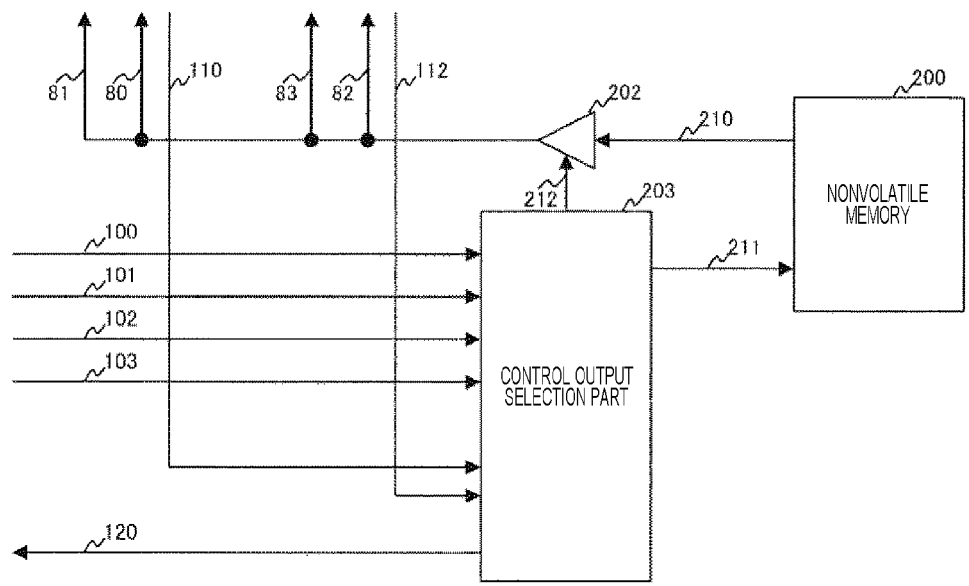
FIG. 8 is an example of a configuration method of a reconfiguration control part in the reconfiguration control device of the second embodiment.

FIG. 8 illustrates an example of a detailed configuration method of the reconfiguration control part 9 illustrated in FIG. 7 and is different in that the control output and the switching control signal corresponding to the dual lockstep core system configuration are added compared to the reconfiguration control part 8 described in FIG. 3.

A control output selection part 203 in FIG. 8 receives the control outputs 100, 101, 102, and 103 and the control outputs 110 and 112 and outputs a memory access signal 211 to the nonvolatile memory 200. Thus, the same operation as that of the control output selection part 201 described in FIG. 3 is performed.

The binary data 210 read from the nonvolatile memory 200 is combined with the core enable signal 212 output from the control output selection part 203 by the signal combining circuit 202, the switching control signals 81 and 80 are output to the cores 20 and 21, and the switching signals 83 and 82 are output to the cores 22 and 23.

Figure 9:
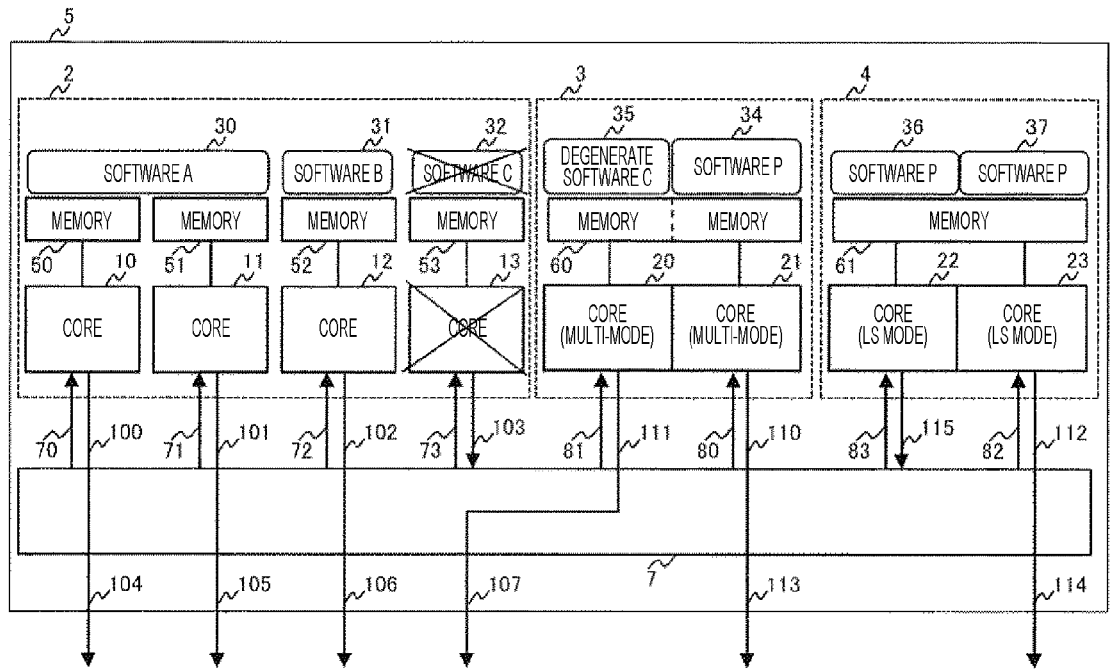
FIG. 9 is an example illustrating a configuration when the lockstep operation is switched to the multi-core operation in the reconfiguration control device of the second embodiment.

FIG. 9 is an example illustrating a configuration of a case where the lockstep operation is switched to the multi-core operation in the reconfiguration control device of the invention in the second embodiment and is different in that the lockstep core is switched from the lockstep operation to the multi-core operation mode, and the software arranged on the memory is replaced compared with the reconfiguration control device illustrated in FIG. 6.

In the control unit 5 of FIG. 9, an example is illustrated in which an error occurs in the core 13 in the multi-core system 2, and the software C (32) becomes inoperable.

According to the control output 103 from the core 13 in which an error has occurred, the cores 20 and 21 are switched from the lockstep operation mode to the multicore operation mode by the switching control signals 81 and 80 from the system control part 7 by the reconfiguration control part 8 described in FIG. 3, and the degenerate software C (35) corresponding to the software C (32) is arranged in the memory 60.

At this time, the selection signal 120 is output from the reconfiguration control part 9 described with reference to FIG. 7 such that the control output 103 from the core 13 in which an error has occurred is not output to the outside of the control unit 5 as the control output 107, and the control output 111 of the core 20 in which the degenerate software C (35) is operating is output as the control output 107.

Figure 10:
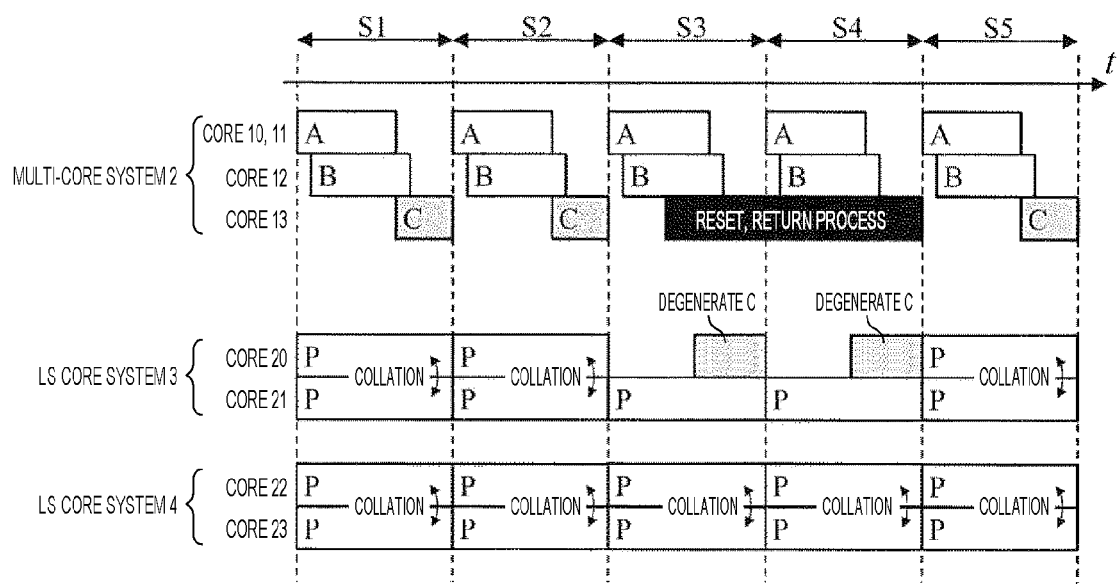
FIG. 10 is an example illustrating a timing chart in which software operates in the configuration of FIG. 9.

FIG. 10 is an example illustrating a timing chart of the software operating in the multi-core system and the lockstep core system in the reconfiguration control device illustrated in FIG. 9 and is different in that the lockstep core system 4 is added compared to the timing chart described in FIG. 5.

In control cycle S3 in FIG. 10, when an error occurs in the core 13, and the software C (32) becomes inoperable, the degenerate operation described in FIG. 9 causes the core 20 to operate the degenerate software C (35), and in the core 13, a return process is performed by a reset signal 73 from the system control part 7.

As described above, even if an error occurs in the core 13, the software A (30), software B (31), degenerate software C (35), and software P (34) can operate in the control cycle S3, and thus a process can continue as a whole system while degenerating without stopping.

In FIG. 10, the software P (36) operates on the core 22 of the lockstep core system 4, the software P (37) operates on the core 23, and the software P (36) and the software P (37) perform a collation process during operation.

As described above, by configuring the reconfiguration control device of the invention as a dual lockstep core system, even if an error occurs in one lockstep core system and the operation is switched to the multi-core operation, another lockstep core system can continue the lockstep operation. Thus, for example, the invention can be applied to a system that requires high reliability, for example, that requires compliance with functional safety standards.

In the second embodiment, the number of cores of the multi-core system is described as four. However, the number of cores is not limited to four and may be implemented with various numbers of cores.

Third Embodiment

Next, an example of another embodiment of the invention will be described with reference to FIGS. 11 and 12.

Figure 11:
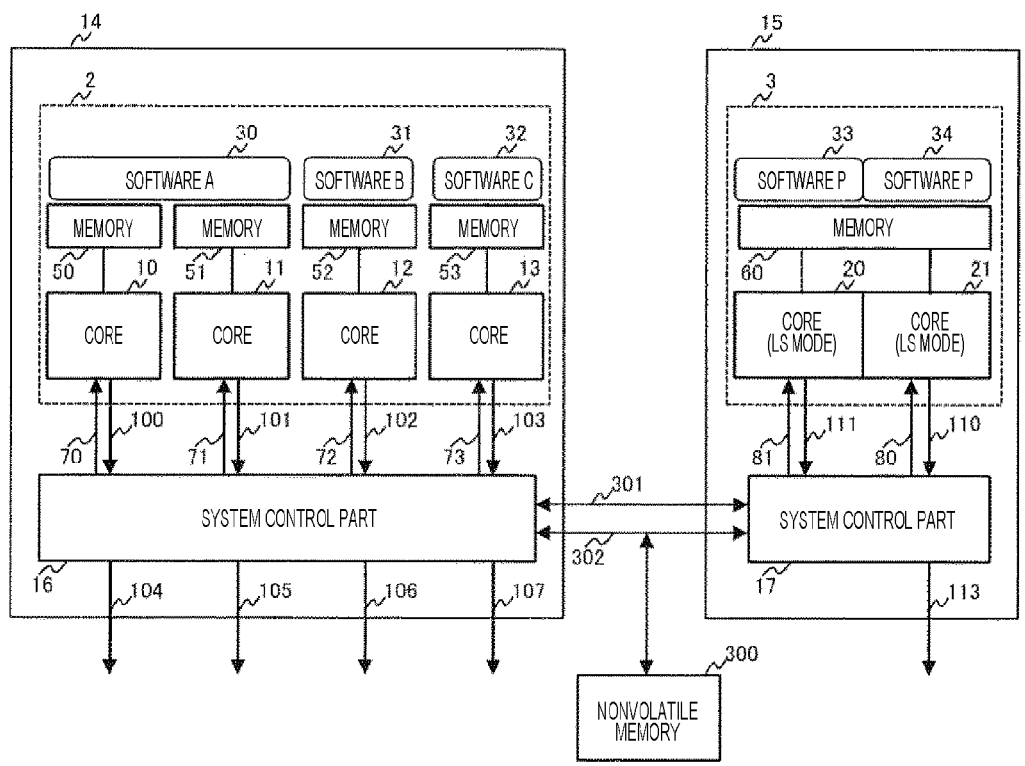
FIG. 11 is an example of a configuration for performing a multi-core operation and a lockstep operation in the reconfiguration control device of the invention in a third embodiment.

FIG. 11 is different from FIG. 1 of the first embodiment in the reconfiguration control device of the invention in that the multi-core system and the lockstep core system are separated to be connected by a bus.

The system control part 16 in FIG. 11 corresponds to the multi-core system 2, the system control part 17 corresponds to the lockstep core system 3, the system control parts 16 and 17 are connected by the control bus 301 and the memory bus 302, and the nonvolatile memory 300 is connected to the memory bus 302. Similarly to the internal configuration of the system control part 6 described with reference to FIG. 2, the internal configuration of the system control parts 16 and 17 includes a multiplexer and a reconfiguration control part. FIG. 12 is an example illustrating a configuration of a case where the lockstep operation is switched to the multi-core operation in the reconfiguration control device of the invention in the third embodiment and is different in that the lockstep core is switched from the lockstep operation to the multi-core operation mode, and the software arranged on the memory is replaced compared with the reconfiguration control device illustrated in FIG. 11.

Figure 12:
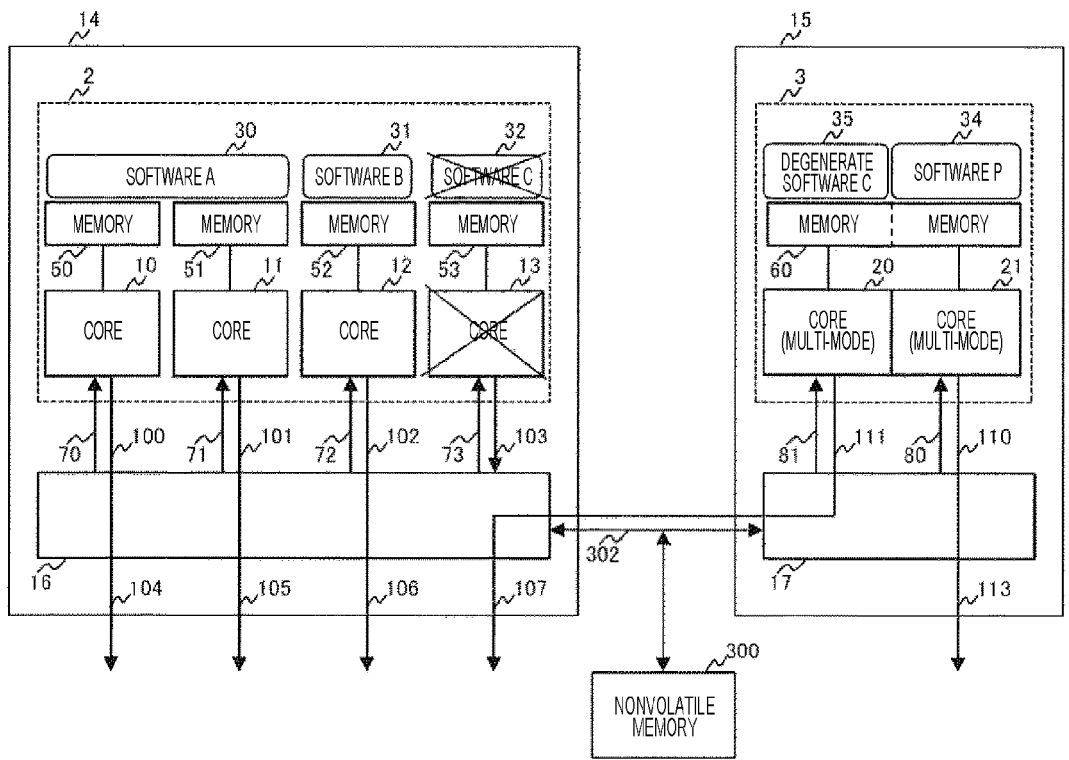
FIG. 12 is an example illustrating a configuration when the lockstep operation is switched to the multi-core operation in the reconfiguration control device of the third embodiment.

In the control units 14 and 15 of FIG. 12, an example is illustrated in which an error occurs in the core 13 in the multi-core system 2, and the software C (32) becomes inoperable.

According to the control output 103 from the core 13 in which an error has occurred, the cores 20 and 21 are switched from the lockstep operation mode to the multicore operation mode by the switching control signals 81 and 80 from the system control part 17 by the reconfiguration control part 16, and the degenerate software C (35) corresponding to the software C (32) is arranged in the memory 60 from the nonvolatile memory 300 via the memory bus 302.

At this time, the reconfiguration control parts 16 and 17 output selection signals such that the control output 103 from the core 13 in which an error has occurred is not output to the outside of the control unit 14 as the control output 107, and the control output 111 of the core 20 in which the degenerate software C (35) is operating is output as the control output 107. By adopting such a configuration, even when the control system must be configured by a plurality of control units, between a control unit having only a multi-core configuration and a control unit having only a lockstep core configuration, the lockstep core can be switched to the multi-core operation to operate the degenerate software. Thus, the operation of the control system can continue without requiring redundant additional hardware costs.

In the example of the third embodiment, the number of cores of the multi-core system is described as four. However, the number of cores is not limited to four and may be implemented with various numbers of cores.

Fourth Embodiment

Figure 13:
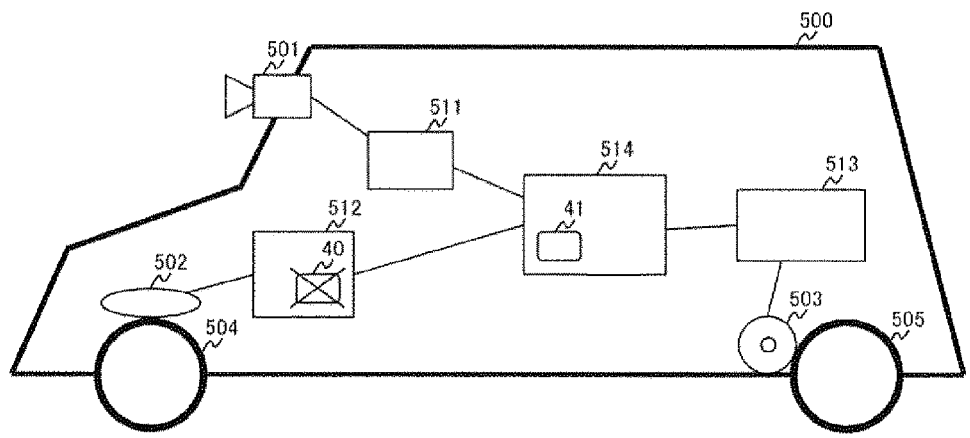
FIG. 13 is a view illustrating an example when the reconfiguration control device of the invention is applied to an in-vehicle system.

Next, an example of another embodiment of the invention will be described with reference to FIG. 13. FIG. 13 illustrates an example when the reconfiguration control device of the invention is applied to an in-vehicle system.

The interior of the automobile 500 is configured by connecting a plurality of electronic control units (Electronic Control Unit, ECU). In this automobile 500, a camera 501 is connected to a camera ECU (511), a steer 502 is connected to a steer ECU (512), a motor 503 is connected to a motor ECU (513), and each ECU of the camera ECU (511), the steer ECU (512), and the motor ECU (513) is connected to an integrated ECU (514) and performs control as an automobile by operating in a coordinated manner.

In this configuration, for example, in a case where an error occurs in the steer ECU (512), in the reconfiguration control device of the invention, when the software 40 operating in the steer ECU (512) is operated as the degenerate software 41 in the integrated ECU (514), the minimum operation for which the steer ECU (512) is responsible is continued, and when the rotation of the front wheels 504 and the rear wheels 505 is continued or stopped depending on the surrounding conditions, a safe operation is secured as the whole automobile 500.

As described above, by applying the reconfiguration control device of the invention, even in a case where an error occurs in a part of the ECUs configuring the automobile, a safety can be maintained as a whole automobile while performing a degenerate operation.

Fifth Embodiment

Figure 14:
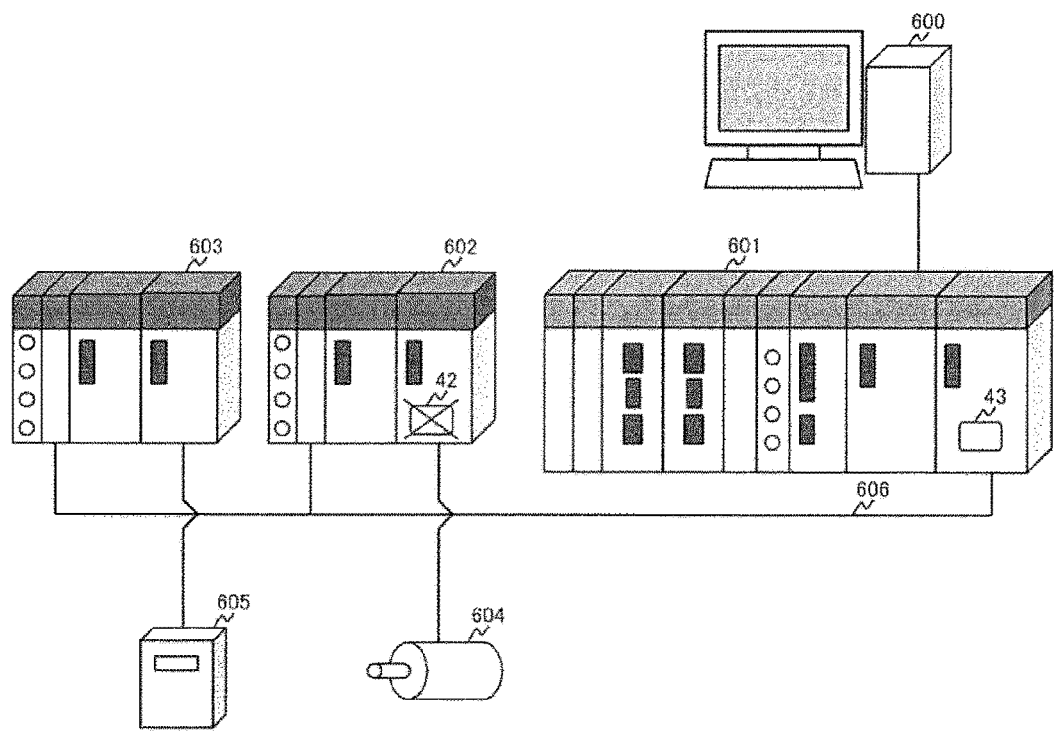
FIG. 14 is a view illustrating an example when the reconfiguration control device of the invention is applied to an industrial control system.

Next, an example of another embodiment of the invention will be described with reference to FIG. 14. FIG. 14 illustrates an example when the reconfiguration control device of the invention is applied to an industrial control system.

This industrial control system includes a computer 600 that controls the system as a whole, a control controller 601 that is controlled by the computer 600, a programmable logic controller 602 that controls a control equipment 604, and a programmable logic controller 603 that controls a control equipment 605. The control controller 601 and the programmable logic controllers 602 and 603 are each connected via a control network 606.

In this configuration, for example, in a case where an error occurs in the programmable logic controller 602, when the reconfiguration control device of the invention causes the software 42 operating in the programmable logic controller 602 to operate as the degenerate software 43 in the control controller 601 via the control network 606, the minimum operation for which the programmable logic controller 602 is responsible is continued, and when the operation of the control equipment 604 is continued or stopped safely, a safe operation is secured as the whole industrial control system.

As described above, the reconfiguration control device of each embodiment includes a multi-core, a lockstep core, and a system control part that dynamically switches the lockstep core to a first core and a second core. The system control part dynamically switches the lockstep core to a multi-core operation when an error occurs in the multi-core, and the system control part instructs restart and diagnosis of the multi-core while the software operating on the multi-core is operating on the first core.

The system control part includes a reconfiguration control part that outputs a selection signal based on values of a control output from the multi-core and a control output from the lockstep core, and a multiplexer that selects a control output from the multi-core and a control output from the lockstep core according to a value of the selection signal.

The reconfiguration control part includes a nonvolatile memory in which the software is arranged, and reads binary data of degenerate software from the nonvolatile memory based the values of the control output from the multi-core and the control output from the lockstep core.

The system control part selects and outputs a control output from the first core instead of the control output from the multi-core when an error occurs in the multi-core.

A multi-core, a first lockstep core, a second lockstep core, and a system control part which dynamically switches the first lockstep core to the first core and the second core are provided. The system control part dynamically switches the first lockstep core to the multi-core operation when an error occurs in the multi-core, and the system control part instructs restart and diagnosis of the multi-core while the software operating on the multi-core is operating on the first core.

As described above, by applying the reconfiguration control device of each embodiment, even in a case where an error occurs in a part of the controllers constituting the industrial control system, a safety can be maintained as a whole system while performing a degenerate operation.

Incidentally, the invention is not limited to the embodiments described above but includes various modifications. For example, the above-described embodiments have been described in detail for easy understanding of the invention, and are not necessarily limited to those having all the described configurations. Also, a part of the configuration of one embodiment can be replaced with the configuration of another embodiment, and the configuration of another embodiment can be added to the configuration of one embodiment. In addition, it is possible to add, delete, and replace other configurations for a part of the configuration of each embodiment.

REFERENCE SIGNS LIST 1, 5, 14, 15 control unit
2 multi-core system
3, 4 lockstep core system
6, 7, 16, 17 system control part
8, 9 reconfiguration control part
10, 11, 12, 13, 20, 21, 22, 23 core
50, 51, 52, 53, 60, 61 memory
90, 91, 92, 93, 94, 95 multiplexer
200, 300 nonvolatile memory
200 signal combining circuit
201, 203 control output selection part
500 automobile
501 camera
502 steer
503 motor
504 front wheel
505 rear wheel
511 camera ECU
512 steer ECU
513 motor ECU
514 integrated ECU
600 computer
601 control controller
602, 603 programmable logic controller
604, 605 control equipment

The invention claimed is:

1. A reconfiguration control device comprising:
a multi-core;
a lockstep core; and
a system control part that dynamically switches the lockstep core to a first core and a second core, wherein
the system control part dynamically switches the lockstep core to a multi-core operation when an error occurs in the multi-core, and
the system control part instructs restart and diagnosis of the multi-core while a software that was operating on the multi-core is operating on the first core.

2. The reconfiguration control device according to claim 1, wherein
the system control part includes
a reconfiguration control part that outputs a selection signal based on values of a control output from the multi-core and a control output from the lockstep core, and
a multiplexer that selects from the control output from the multi-core and the control output from the lockstep core according to a value of the selection signal.

3. The reconfiguration control device according to claim 2, wherein
the reconfiguration control part
includes a nonvolatile memory in which the software is arranged, and
reads binary data of degenerate software from the nonvolatile memory based on the values of the control output from the multi-core and the control output from the lockstep core.

4. The reconfiguration control device according to claim 1, wherein
the system control part selects and outputs a control output from the first core instead of a control output from the multi-core when the error occurs in the multi-core.

5. A reconfiguration control device comprising:
a multi-core;
a first lockstep core;
a second lockstep core; and
a system control part that dynamically switches the first lockstep core to a first core and a second core, wherein
the system control part dynamically switches the first lockstep core to a multi-core operation when an error occurs in the multi-core, and
the system control part instructs restart and diagnosis of the multi-core while a software that was operating on the multi-core is operating on the first core.

6. The reconfiguration control device according to claim 5, wherein the system control part includes a reconfiguration control part that outputs a selection signal based on values of a control output from the multi-core and a control output from the first lockstep core, and a multiplexer that selects from the control output from the multi-core and the control output from the first lockstep core according to a value of the selection signal.

7. The reconfiguration control device according to claim 6, wherein the reconfiguration control part includes a nonvolatile memory in which the software is arranged, and reads binary data of degenerate software from the nonvolatile memory based on the values of the control output from the multi-core and the control output from the first lockstep core.

8. The reconfiguration control device according to claim 5, wherein the system control part selects and outputs a control output from the first core instead of a control output from the multi-core when the error occurs in the multi-core.

* * * * *